United States Patent
Vo et al.

(10) Patent No.: US 10,167,779 B2
(45) Date of Patent: Jan. 1, 2019

(54) MID-TURBINE FRAME HEAT SHIELD

(71) Applicant: United Technologies Corporation, Hartford, CT (US)

(72) Inventors: Tuan David Vo, Middletown, CT (US); Shelton O. Duelm, Wethersfield, CT (US)

(73) Assignee: United Technologies Corporation, Farmington, CT (US)

( * ) Notice: Subject to any disclaimer, the term of this patent is extended or adjusted under 35 U.S.C. 154(b) by 1830 days.

(21) Appl. No.: 13/630,019

(22) Filed: Sep. 28, 2012

(65) Prior Publication Data

US 2014/0093371 A1 Apr. 3, 2014

(51) Int. Cl.
| | | |
|---|---|---|
| *F02C 7/20* | (2006.01) | |
| *F02C 7/24* | (2006.01) | |
| *F01D 9/02* | (2006.01) | |
| *F01D 25/14* | (2006.01) | |
| *F01D 25/26* | (2006.01) | |

(52) U.S. Cl.
CPC .............. *F02C 7/24* (2013.01); *F01D 9/023* (2013.01); *F01D 25/145* (2013.01); *F01D 25/26* (2013.01); *F02C 7/20* (2013.01); *F05D 2240/14* (2013.01); *F05D 2240/15* (2013.01); *F05D 2260/231* (2013.01); *Y02T 50/675* (2013.01)

(58) Field of Classification Search
CPC .... F02C 7/20; F02C 7/24; F01D 9/023; F01D 25/145; F01D 25/26
USPC ........ 60/805, 796, 798, 799; 415/119, 214.1
See application file for complete search history.

(56) References Cited

U.S. PATENT DOCUMENTS

| | | | |
|---|---|---|---|
| 4,920,742 A | 5/1990 | Nash et al. | |
| 4,987,736 A | 1/1991 | Ciokajlo et al. | |
| 5,357,744 A | 10/1994 | Czachor et al. | |
| 6,719,524 B2 | 4/2004 | Nguyen et al. | |
| 7,775,049 B2 | 8/2010 | Kumar et al. | |
| 8,181,466 B2 | 5/2012 | Kumar et al. | |
| 8,181,467 B2 | 5/2012 | Kumar et al. | |
| 2002/0122716 A1 | 9/2002 | Beacock et al. | |
| 2007/0144177 A1 | 6/2007 | Burd | |
| 2010/0132372 A1* | 6/2010 | Durocher ................ | F01D 9/065 60/796 |
| 2010/0202872 A1 | 8/2010 | Weidmann | |
| 2010/0275572 A1 | 11/2010 | Durocher et al. | |
| 2011/0081237 A1 | 4/2011 | Durocher et al. | |
| 2013/0309078 A1* | 11/2013 | Vo ............................ | F01D 9/04 415/208.1 |

FOREIGN PATENT DOCUMENTS

WO 2013176920 11/2013

OTHER PUBLICATIONS

International Preliminary Report on Patentability for International Application No. PCT/US2013/059888 dated Apr. 9, 2015.

(Continued)

*Primary Examiner* — Dwayne J White
*Assistant Examiner* — Maxime Adjagbe
(74) *Attorney, Agent, or Firm* — Carlson, Gaskey & Olds, P.C.

(57) ABSTRACT

A heat shield for a mid-turbine frame has a conical body, including at least one axial retention feature, at least one circumferential retention feature, and at least one radial retention feature.

20 Claims, 3 Drawing Sheets

(56) References Cited

OTHER PUBLICATIONS

International Search Report for PCT Application No. PCT/US2013/059888 dated Jun. 17, 2014.
Extended European Search Report for Application No. 13860847.6 dated Mar. 22, 2016.

* cited by examiner

MID-TURBINE FRAME HEAT SHIELD

TECHNICAL FIELD

The present disclosure is generally related to turbine engines, and more particularly related to a heat shield for use in a mid-turbine frame module of a turbine engine.

BACKGROUND OF THE INVENTION

Gas turbine engines, such as those utilized in commercial aircraft, typically include a compressor section that compresses gas passing through the turbine engine, and a turbine section in which the compressed gas expands, thereby forcing rotational movement of the turbine. Between two portions of the turbine section is a structural frame. The structural frame is referred to in this disclosure as a mid-turbine frame. The mid-turbine frame provides structural support to the turbine engine housing, as well as incorporating a section of the gas flowpath.

In order to protect the engine housing from heat originating from the gasses flowing through a vane pack in the mid-turbine frame, a heat shield is incorporated into the mid-turbine frame between an outer diameter case of the gas turbine engine and the gas flowpath. Current heat shields utilize multiple segments that are bolted or welded to the body of the mid-turbine frame, and combine to form a single heat shield after assembly. The heat shield components are designed to accommodate the structural struts of the mid-turbine frame. The fasteners used to hold the heat shield in place within the mid-turbine frame, further provide a thermal pathway for heat to escape through the heat shield.

SUMMARY OF THE INVENTION

A turbine engine according to an exemplary embodiment of this disclosure, among other possible things includes a compressor section, a combustor in fluid communication with the compressor section, a turbine section in fluid communication with the combustor a frame connecting a first portion of said turbine engine to a second portion of the turbine engine, wherein said frame includes a heat shield, and wherein said heat shield is a single unit comprising, a conical body, at least one axial retention feature operable to prevent the heat shield from shifting axially within the turbine engine, at least one circumferential retention feature operable to prevent the heat shield from rotating about an axis defined by the turbine engine, and at least one radial retention feature operable to dampen vibrational movement of the heat shield by positioning the heat shield radially.

In a further embodiment of the foregoing turbine engine, the axial retention feature includes a plurality of tabs extending radially inward from the heat shield relative to the axis.

In a further embodiment of the foregoing turbine engine, the plurality of tabs are spaced approximately evenly about a circumference of the heat shield.

In a further embodiment of the foregoing turbine engine, each of the plurality of tabs contacts a feature of an outer diameter wall of the frame.

In a further embodiment of the foregoing turbine engine, the at least one circumferential retention feature includes a plurality of axially aligned tabs extending from a circumference of the heat shield, and each of the axially aligned tabs is retained by at least one frame feature, thereby prohibiting rotation of the heat shield about the axis.

In a further embodiment of the foregoing turbine engine, the plurality of axially aligned tabs are approximately evenly spaced about the circumference of the heat shield.

In a further embodiment of the foregoing turbine engine, each of the at least one radial retention features includes a curved tab extending from a circumference of the heat shield, and the curved tab contacts a wall of a gas flow path in the frame, thereby minimizing radial movement of the heat shield, relative to the axis.

In a further embodiment of the foregoing turbine engine, a plurality of the at least one radial retention features extend from the circumference, and each of the radial retention features extending from the circumference is approximately evenly spaced about the circumference.

In a further embodiment of the foregoing turbine engine, the heat shield is maintained in position without the use of fasteners.

In a further embodiment of the foregoing turbine engine, the conical body includes a plurality of holes operable to receive frame struts.

In a further embodiment of the foregoing turbine engine, the frame is a mid-turbine frame.

A heat shield for a mid-turbine frame according to an exemplary embodiment of this disclosure, among other possible things includes a conical body having a plurality of openings for receiving mid-turbine frame struts, at least one axial retention feature operable to prevent the heat shield from shifting axially, at least one circumferential retention feature operable to prevent the heat shield from rotating about an axis defined by the heat shield, and at least one radial retention feature operable to dampen vibrational movement of the heat shield by positioning the heat shield radially.

In a further embodiment of the foregoing heat shield, the axial retention feature includes a plurality of tabs extending radially from the heat shield relative to the axis.

In a further embodiment of the foregoing heat shield, the plurality of tabs are spaced approximately evenly about a circumference of the heat shield.

In a further embodiment of the foregoing heat shield, each of the plurality of tabs contacts an aft wall of the mid-turbine frame.

In a further embodiment of the foregoing heat shield, the at least one circumferential retention feature includes a plurality of axially aligned tabs extending from a circumference of the heat shield, and each of the axially aligned tabs is operable to be retained by at least one mid-turbine frame feature, thereby prohibiting rotation of the heat shield about the axis.

In a further embodiment of the foregoing heat shield, the plurality of axially aligned tabs are approximately evenly spaced about the a circumference of the heat shield.

In a further embodiment of the foregoing heat shield, each of the at least one radial retention features includes a curved tab extending from a circumference of the heat shield, and the curved tab is operable to contact an inner wall of a mid-turbine frame, thereby minimizing radial movement of the heat shield, relative to the axis.

In a further embodiment of the foregoing heat shield, a plurality of the at least one radial retention features extend from the circumference, and each of the radial retention features extending from the circumference is approximately evenly spaced about the circumference.

These and other features of the present invention can be best understood from the following specification and drawings, the following of which is a brief description.

DETAILED DESCRIPTION

Figure 1:
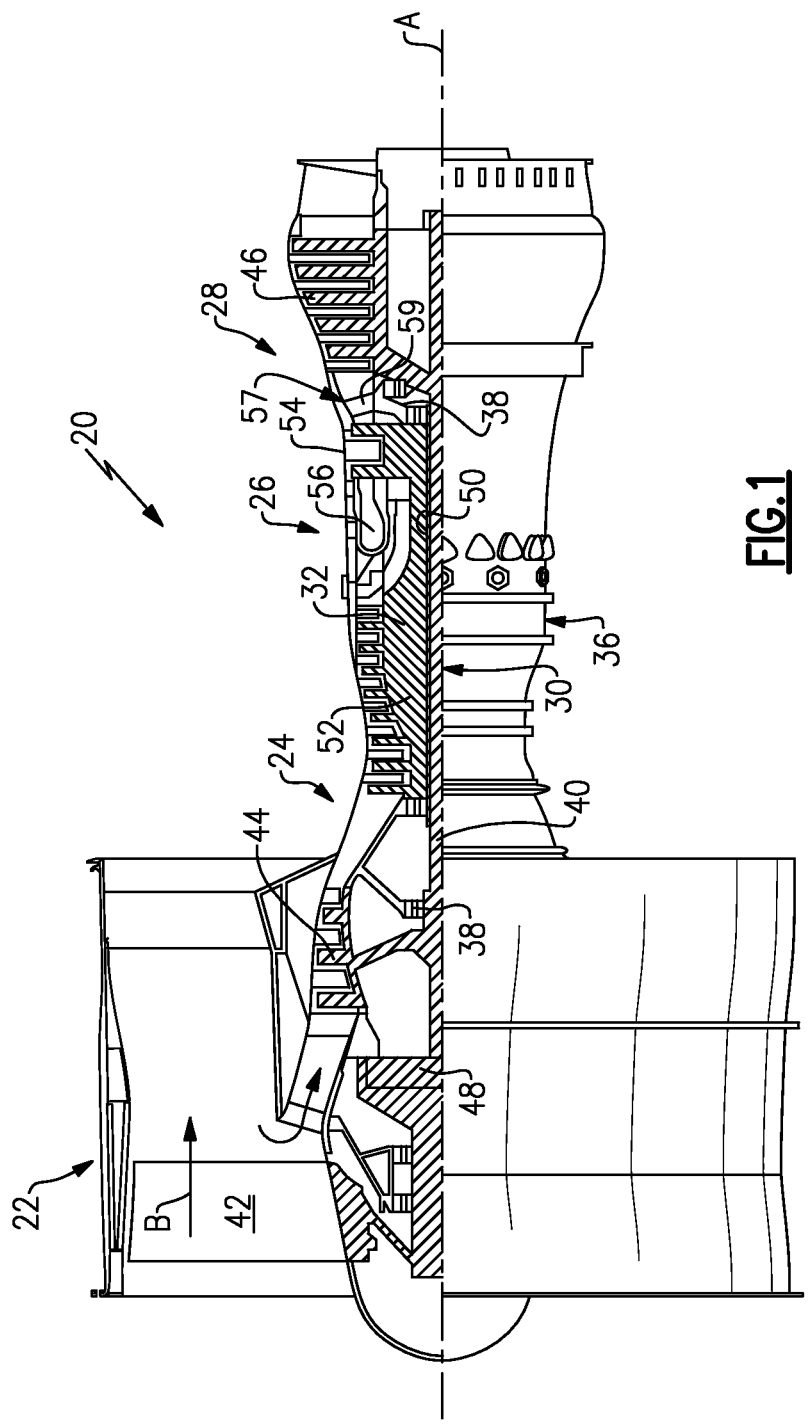
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion.

The engine 20 in one example a high-bypass geared aircraft engine. In a further example, the engine 20 bypass ratio is greater than about six (6), with an example embodiment being greater than ten (10), the geared architecture 48 is an epicyclic gear train, such as a planetary gear system or other gear system, with a gear reduction ratio of greater than about 2.3 and the low pressure turbine 46 has a pressure ratio that is greater than about 5. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ("TSFCT")"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft./sec divided by an industry standard temperature correction of [(Tram ° R)/(518.7° R)] 0.5. The "Low corrected fan tip speed" as disclosed herein according to one non-limiting embodiment is less than about 1150 ft./second.

Figure 2:
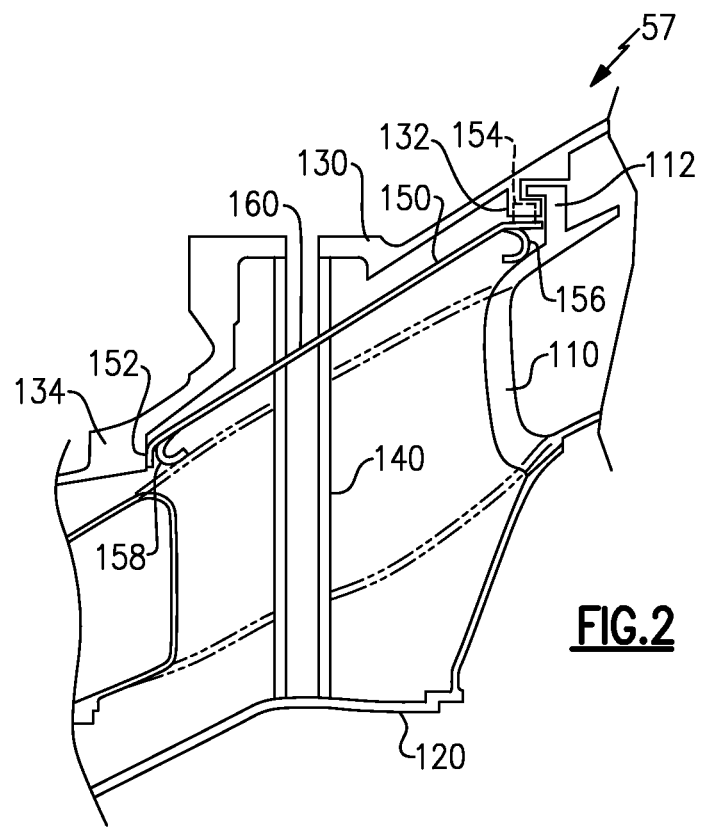
FIG. 2 schematically illustrates a cross sectional view of a mid-turbine frame section of the gas turbine engine of claim 1.

FIG. 2 schematically illustrates a zoomed in view of the mid-turbine frame 57 of FIG. 1. The mid-turbine frame 57 includes an angled gas flowpath 110 passing through the mid-turbine frame 57. The flowpath 110 is between an inner diameter wall 120, and an outer diameter wall 130. A strut 140 provides structural support to the casing of the mid-turbine frame 57 and the casing of the gas turbine engine 20. The flowpath 110 is maintained in position within the mid-turbine frame 57 using a flowpath hook 112 attached to the flowpath 110. The flowpath hook 112 interfaces with a corresponding outer diameter hook 132 attached to the outer diameter wall 130. Multiple flowpath hooks 112 and outer diameter hooks 132 are spaced circumferentially about the flowpath 110 and the outer diameter wall 130. In an alternate example, the flowpath hooks 112 and the outer diameter hooks 132 are integral to the corresponding components. In alternate examples, the flowpath 110 is maintained in position within the mid-turbine frame 57 using alternate components such as pins or fasteners, with minor modifications to disclosed design.

Gas passing through the compressor section 24 of the turbine engine 20 to the turbine section 28 of the turbine engine 20 is heated and passes through the flowpath 110. In order to prevent the heat from the gas passing through the mid-turbine frame 57 from adversely affecting the outer diameter wall 130 and the engine casing, a heat shield 150 is incorporated into the mid-turbine frame 57 module.

Figure 3:
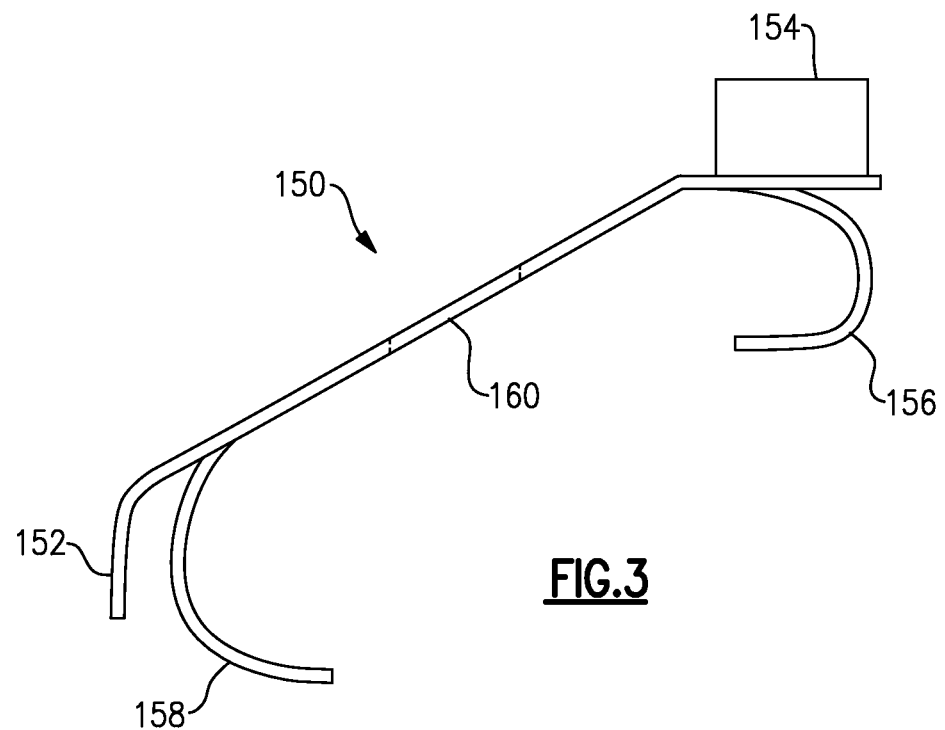
FIG. 3 schematically illustrates a cross sectional view of a heat shield component of the mid-turbine frame of FIG. 2.

With continued reference to FIG. 2, FIG. 3 illustrates the heat shield 150 of FIG. 2 isolated from the schematic drawing of the mid-turbine frame 57, with like numerals indicating like elements. The heat shield 150 is single conical structure that includes openings 160 to allow the struts 140 to pass through the heat shield 150. An axial retention feature 152 is located on a fore end of the heat shield 150. The axial retention feature 152 is a tab that extends radially toward the engine centerline axis A (defined in FIG. 1). The axial retention feature 152 abuts an outer diameter wall feature 134 and prevents the heat shield from sliding axially into the mid-turbine frame 57 once the heat shield 150 has been installed. Once the mid-turbine frame 57 is assembled, the aft end of the heat shield 150 abuts the flowpath hooks 112, and the heat shield 150 is retained axially by a combination of the axial retention features 152 and the flowpath hook 112.

On an aft end of the heat shield 150 is a circumferential retention feature 154. The circumferential retention feature 154 is a tab extending radially away from the engine centerline axis A toward the outer diameter wall 130. The circumferential retention feature 154 is positioned between two outer diameter hooks 132. The circumferential retention feature is tight fit between the two outer diameter hooks 132, thereby preventing the heat shield 150 from rotating circumferentially about the engine centerline axis A. In alternate examples, the circumferential retention feature 154 can extend radially toward the engine centerline axis A and achieve similar affects.

Located on both the fore and aft ends of the heat shield 150 are radial retention features 156 (aft) and 158 (fore). The radial retention features 156, 158 are curved tabs that curve radially inward and provide a spring effect. The radial retention features 156, 158 contact a wall of the gas flowpath 110 and absorb vibrations from the gas turbine engine 20. By absorbing vibrations using the spring-like radial retention features 156, 158, the heat shield 150 is prevented from shifting radially with respect to the engine centerline axis A.

Each of the above described retention features, 152, 154, 156, 158 are located on either the aft circumferential edge of the heat shield 150 or the fore circumferential edge of the heat shield 150 and are iterated multiple times on a single heat shield 150. When the mid-turbine frame 57 is fully assembled, the heat shield 150 is retained in position via the various retention features 152, 154, 156, 158 described above, and no fasteners are utilized, thereby minimizing potential heat paths through the heat shield 150.

Furthermore, while each of the above described retention features is illustrated on a particular circumference of the heat shield 150, it is understood that the features could be located on a different circumference with minimal modification to the above disclosed design.

Figure 4:
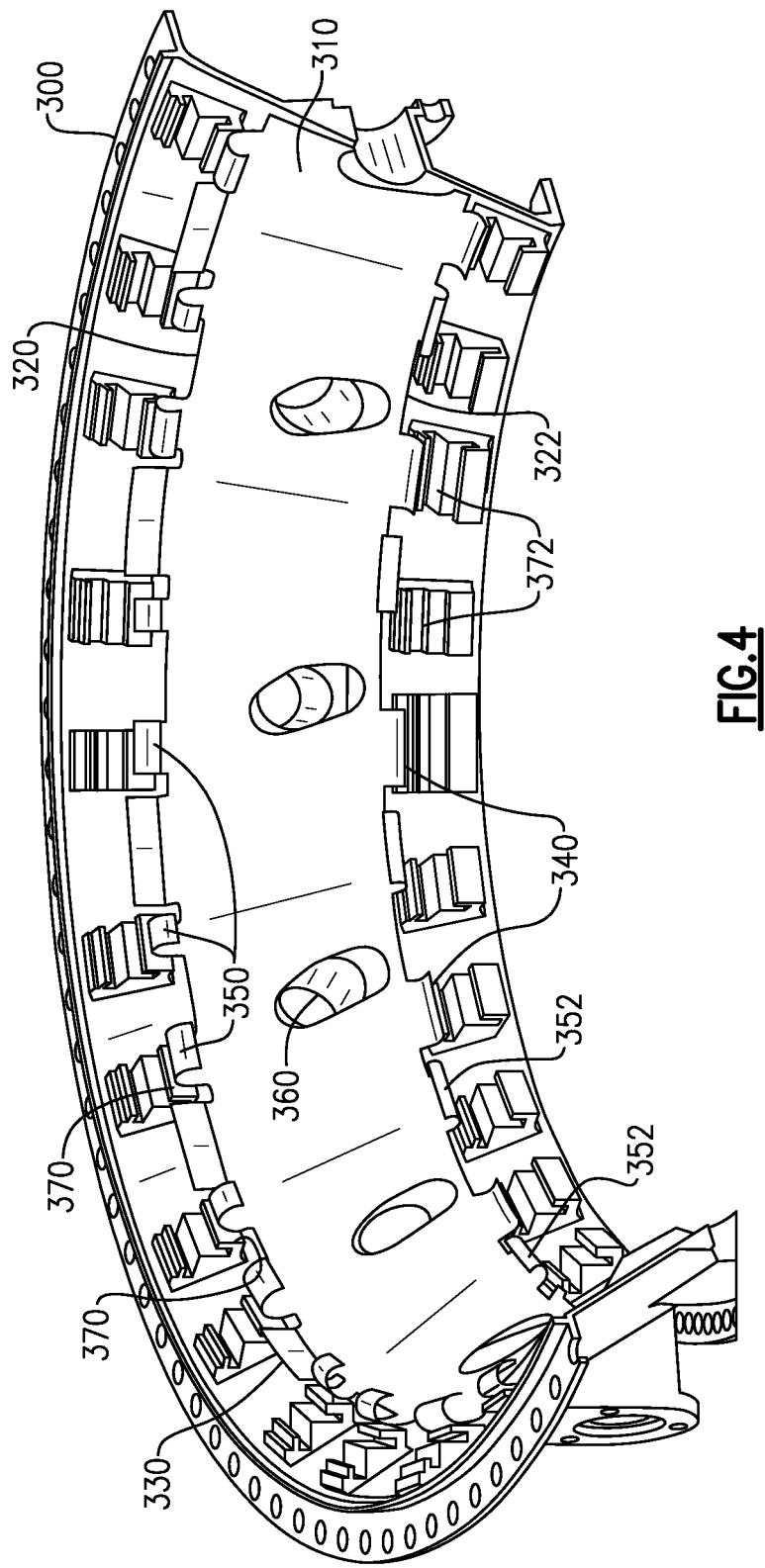
FIG. 4 illustrates an isometric view of the heat shield of FIG. 3 within the context of a mid-turbine frame.

FIG. 4 illustrates a partially assembled mid-turbine frame 300 including a three dimensional view of a heat shield 310. As described above, the heat shield is a single conical unit with an aft edge 320 and a fore edge 322. Axial retention features 340 are spaced circumferentially about the fore edge of the heat shield 310. Each of the axial retention features 340 abuts an aftward outer diameter wall feature 372 of the mid-turbine frame 300. Similarly, circumferential retention features 330 are spaced circumferentially about the aft circumferential edge of the heat shield 310. Each of the circumferential retention features 330 are tight fit between two outer diameter hooks 370.

Multiple aft radial retention features 350 are spaced about the aft circumferential edge 320 of the heat shield 310, and multiple fore radial retention features 352 are spaced about the fore circumferential edge 322 of the heat shield 310. Holes 360 are located in the center of the heat shield 310 and spaced throughout the heat shield 310. Each of the holes 360 is positioned to allow a mid-turbine frame strut to pass through the heat shield 310.

Utilization of a single conical unit as the heat shield 310, including the above described retention features, allows the heat shield 310 to be installed into a mid-turbine frame 57 securely without requiring the use of fasteners to retain the heat shield 310 in place. Furthermore, the single heat shield 310 eases the difficulty of assembly by not requiring a technician assembling the mid-turbine frame 57 to assembly multiple varied components of a heat shield. Thus, further reducing the chance that a technician will improperly assemble the mid-turbine frame 57.

While the illustrated features are spaced uniformly about the aft and fore circumferential edges of the heat shield 310, it is understood that unique features of some mid-turbine frames could require one or more of the features to be slightly offset circumferentially. In such a case, the retention features 330, 340, 350, and 352 are referred to as being spaced approximately evenly about the circumference. It is further understood that one or more retention feature 330, 340, 350 and 352 can be offset to facilitate assembly by creating a "keyed" arrangement of retention features 330, 340, 350 and 352.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A turbine engine comprising:
a compressor section;
a combustor in fluid communication with the compressor section;
a turbine section in fluid communication with the combustor;
a frame connecting a first portion of said turbine engine a second portion of the turbine engine, wherein said frame includes a heat shield, and wherein said heat shield is a single unit comprising:
a conical body;
at least one axial retention feature operable to prevent said heat shield from shifting axially within the turbine engine;
at least one circumferential retention feature operable to prevent the heat shield from rotating about an axis defined by the turbine engine; and
at least one radial retention feature operable to dampen vibrational movement of the heat shield by positioning the heat shield radially.

2. The turbine engine of claim 1, wherein said axial retention feature comprises a plurality of tabs extending radially from said heat shield relative to said axis.

3. The turbine engine of claim 2, wherein said plurality of tabs are spaced approximately evenly about a circumference of said heat shield.

4. The turbine engine of claim 2, wherein each of said plurality of tabs contacts a feature of an outer diameter wall of a mid-turbine frame.

5. The turbine engine of claim 1, wherein said conical body comprises a plurality of holes operable to receive frame struts.

6. The turbine engine of claim 1, wherein said frame is a mid-turbine frame.

7. The turbine engine of claim 1, wherein the heat shield extends from a first outer diameter wall contact to a second outer diameter wall contact.

8. A turbine engine comprising:
a compressor section;
a combustor in fluid communication with the compressor section;

a turbine section in fluid communication with the combustor;
a frame connecting a first portion of said turbine engine a second portion of the turbine engine, wherein said frame includes a heat shield, and wherein said heat shield is a single unit comprising:
a conical body;
at least one axial retention feature operable to prevent said heat shield from shifting axially within the turbine engine;
at least one circumferential retention feature operable to prevent the heat shield from rotating about an axis defined by the turbine engine;
at least one radial retention feature operable to dampen vibrational movement of the heat shield by positioning the heat shield radially; and
wherein said at least one circumferential retention feature comprises a plurality of axially aligned tabs extending from a circumference of said heat shield, and wherein each of said axially aligned tabs is retained by at least one frame feature, thereby prohibiting rotation of the heat shield about said axis.

9. The turbine engine of claim 8, wherein said at plurality of axially aligned tabs are approximately evenly spaced about said circumference of said heat shield.

10. A turbine engine comprising:
a compressor section;
a combustor in fluid communication with the compressor section;
a turbine section in fluid communication with the combustor;
a frame connecting a first portion of said turbine engine a second portion of the turbine engine, wherein said frame includes a heat shield, and wherein said heat shield is a single unit comprising:
a conical body;
at least one axial retention feature operable to prevent said heat shield from shifting axially within the turbine engine;
at least one circumferential retention feature operable to prevent the heat shield from rotating about an axis defined by the turbine engine;
at least one radial retention feature operable to dampen vibrational movement of the heat shield by positioning the heat shield radially; and
wherein each of said at least one radial retention features comprises a curved tab extending from a circumference of said heat shield, and wherein said curved tab contacts a wall of a gas flow path in said frame, thereby minimizing radial movement of the heat shield, relative to said axis.

11. The turbine engine of claim 10, wherein a plurality of said at least one radial retention features extend from said circumference, and wherein each of said radial retention features extending from said circumference is approximately evenly spaced about said circumference.

12. A turbine engine comprising:
a compressor section;
a combustor in fluid communication with the compressor section;
a turbine section in fluid communication with the combustor;
a frame connecting a first portion of said turbine engine a second portion of the turbine engine, wherein said frame includes a heat shield, and wherein said heat shield is a single unit comprising:
a conical body;
at least one axial retention feature operable to prevent said heat shield from shifting axially within the turbine engine;
at least one circumferential retention feature operable to prevent the heat shield from rotating about an axis defined by the turbine engine; and
at least one radial retention feature operable to dampen vibrational movement of the heat shield by positioning the heat shield radially; and
wherein said heat shield is maintained in position without the use of fasteners.

13. A heat shield for a mid-turbine frame comprising:
a conical body having a plurality of openings for receiving mid-turbine frame struts;
at least one axial retention feature operable to prevent said heat shield from shifting axially;
at least one circumferential retention feature operable to prevent the heat shield from rotating about an axis defined by the heat shield;
at least one radial retention feature operable to dampen vibrational movement of the heat shield by positioning the heat shield radially; and
wherein the heat shield is a single unit.

14. The heat shield of claim 13, wherein said axial retention feature comprises a plurality of tabs extending radially from said heat shield relative to said axis.

15. The heat shield of claim 14, wherein said plurality of tabs are spaced approximately evenly about a circumference of said heat shield.

16. The heat shield of claim 14, wherein each of said plurality of tabs contacts a feature of an outer diameter wall of said mid-turbine frame.

17. A heat shield for a mid-turbine frame comprising:
a conical body having a plurality of openings for receiving mid-turbine frame struts;
at least one axial retention feature operable to prevent said heat shield from shifting axially;
at least one circumferential retention feature operable to prevent the heat shield from rotating about an axis defined by the heat shield, the at least one circumferential feature including, said at least one circumferential retention feature including a plurality of axially aligned tabs extending from a circumference of said heat shield, each of said axially aligned tabs is operable to be retained by at least one mid-turbine frame feature, thereby prohibiting rotation of the heat shield about said axis; and
at least one radial retention feature operable to dampen vibrational movement of the heat shield by positioning the heat shield radially.

18. The heat shield of claim 17, wherein said at plurality of axially aligned tabs are approximately evenly spaced about said circumference of said heat shield.

19. A heat shield for a mid-turbine frame comprising:
a conical body having a plurality of openings for receiving mid-turbine frame struts;
at least one axial retention feature operable to prevent said heat shield from shifting axially;
at least one circumferential retention feature operable to prevent the heat shield from rotating about an axis defined by the heat shield; and
at least one radial retention feature operable to dampen vibrational movement of the heat shield by positioning the heat shield radially, wherein each of said at least one radial retention features includes a curved tab extending from a circumference of said heat shield, said curved tab is operable to contact an inner wall of a mid-turbine frame, thereby minimizing radial movement of the heat shield, relative to said axis.

20. The heat shield of claim 19, wherein a plurality of said at least one radial retention features extend from said circumference, and wherein each of said radial retention features extending from said circumference is approximately evenly spaced about said circumference.

* * * * *